(12) United States Patent
Crandall

(10) Patent No.: US 8,798,444 B1
(45) Date of Patent: Aug. 5, 2014

(54) AUTOMATIC PRIORITIZATION OF TIMERS BASED ON FREQUENCY

(71) Applicant: EchoStar Technologies L.L.C., Englewood, CO (US)

(72) Inventor: David Lee Crandall, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/796,114

(22) Filed: Mar. 12, 2013

(51) Int. Cl.
*H04N 5/76* (2006.01)

(52) U.S. Cl.
USPC .......................................................... 386/292

(58) Field of Classification Search
CPC ........... H04N 5/00; H04N 21/00; H04N 5/76; H04N 5/775; H04N 21/4583
USPC ......................................... 386/200, 291, 292
See application file for complete search history.

(56) References Cited

U.S. PATENT DOCUMENTS

| 2008/0276284 A1* | 11/2008 | Bumgardner et al. ........... 725/58 |
| 2011/0103774 A1* | 5/2011 | Howarter et al. .............. 386/293 |
| 2011/0185388 A1* | 7/2011 | Gratton ........................... 725/53 |
| 2011/0194840 A1* | 8/2011 | Alexander ..................... 396/293 |
| 2011/0271306 A1* | 11/2011 | Kahn et al. ....................... 725/68 |

* cited by examiner

*Primary Examiner* — Huy T Nguyen
(74) *Attorney, Agent, or Firm* — Seed IP Law Group PLLC

(57) ABSTRACT

A television receiver includes control circuitry and a DVR. The control circuitry is configured to receive a request to record first and second media programs to the DVR. The control circuitry determines if there is a scheduling conflict between the first and second media programs. If there is a scheduling conflict the control circuitry counts the number of times that each of the first and second media programs will air in a given time period and assigns a higher recording priority to the media program that will air fewer times.

17 Claims, 6 Drawing Sheets

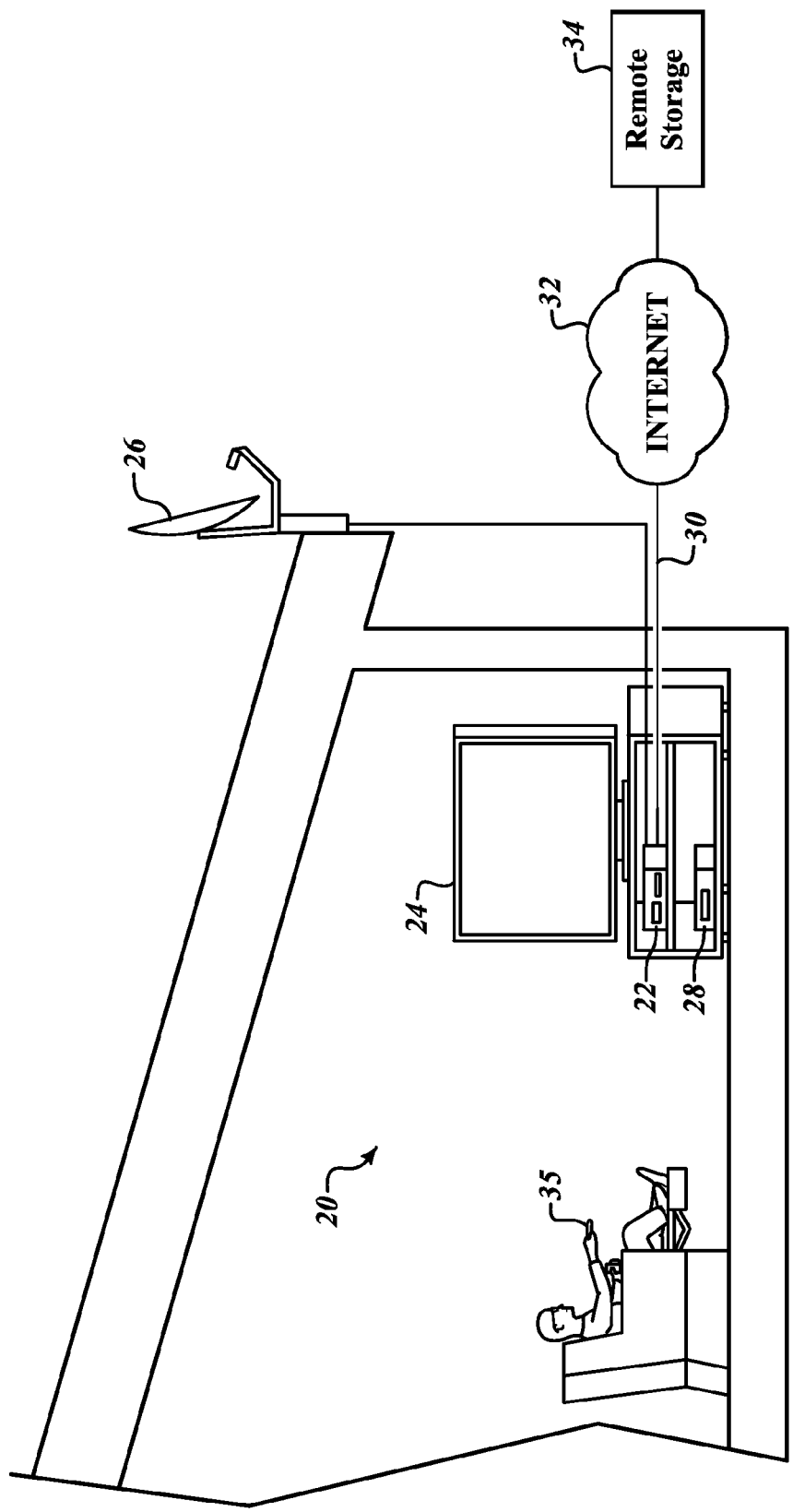

Program Guide

| | 6:00 | 6:30 | 7:00 | 7:30 | 8:00 |
|---|---|---|---|---|---|
| CBS | CBS Evening News | | ET | Big Bang Theory | Two and a Half Men |
| ABC | ABC World News | | Wheel of Fortune | Jeopardy | Zero Hour |
| NBC | NBC Nightly News | | Evening Magazine | Inside Edition | Community |
| ESPN | NBA Basketball: Miami Heat vs. Chicago Bulls | | | | |
| ESPN2 | College Basketball | College Basketball | | | |
| TBS | Seinfeld | Seinfeld | Family Guy | Family Guy | Big Bang Theory |
| CNN | Piers Morgan | | Anderson Cooper | | Outfront |

*FIG.2*

Recording Schedule

| Channel | Program | Date | Time |
|---------|---------|------|------|
| TBS | Seinfeld | March 13 | 6:00 - 7:00 PM |
| ESPN | NBA Basketball | March 13 | 6:00 - 9:00 PM |
| CBS | 60 Minutes | March 17 | 6:00 - 7:00 PM |
| ESPN | NBA Basketball | March 20 | 6:00 - 8:00 PM |
| PBS | Leaving Home, Coming Home... | March 22 | 10:00 - 11:00 PM |
| FOX | American Idol | March 22 | 8:00 - 9:00 PM |
| ABC | General Hospital | March 25 | 2:00 - 3:00 PM |

March 2013

| Sunday | Monday | Tuesday | Wenesday | Thursday | Friday | Saturday |
|---|---|---|---|---|---|---|
|  |  |  |  |  | 1<br>Seinfeld 2x | 2 |
| 3 | 4<br>Seinfeld 2x | 5<br>Seinfeld 2x | 6<br>Seinfeld 2x | 7<br>Seinfeld 2x | 8<br>Seinfeld 2x | 9 |
| 10 | 11<br>Seinfeld 2x | 12<br>Seinfeld 2x | 13<br>Heat vs. Bulls<br>Seinfeld 2x | 14<br>Seinfeld 2x | 15<br>Seinfeld 2x | 16 |
| 17 | 18<br>Seinfeld 2x | 19<br>Seinfeld 2x | 20<br>Seinfeld 2x | 21<br>Seinfeld 2x | 22<br>Seinfeld 2x | 23 |
| 24 | 25<br>Seinfeld 2x | 26<br>Seinfeld 2x | 27<br>Seinfeld 2x | 28<br>Seinfeld 2x | 29<br>Seinfeld 2x | 30 |
| 31 |  |  |  |  |  |  |

*FIG.4*

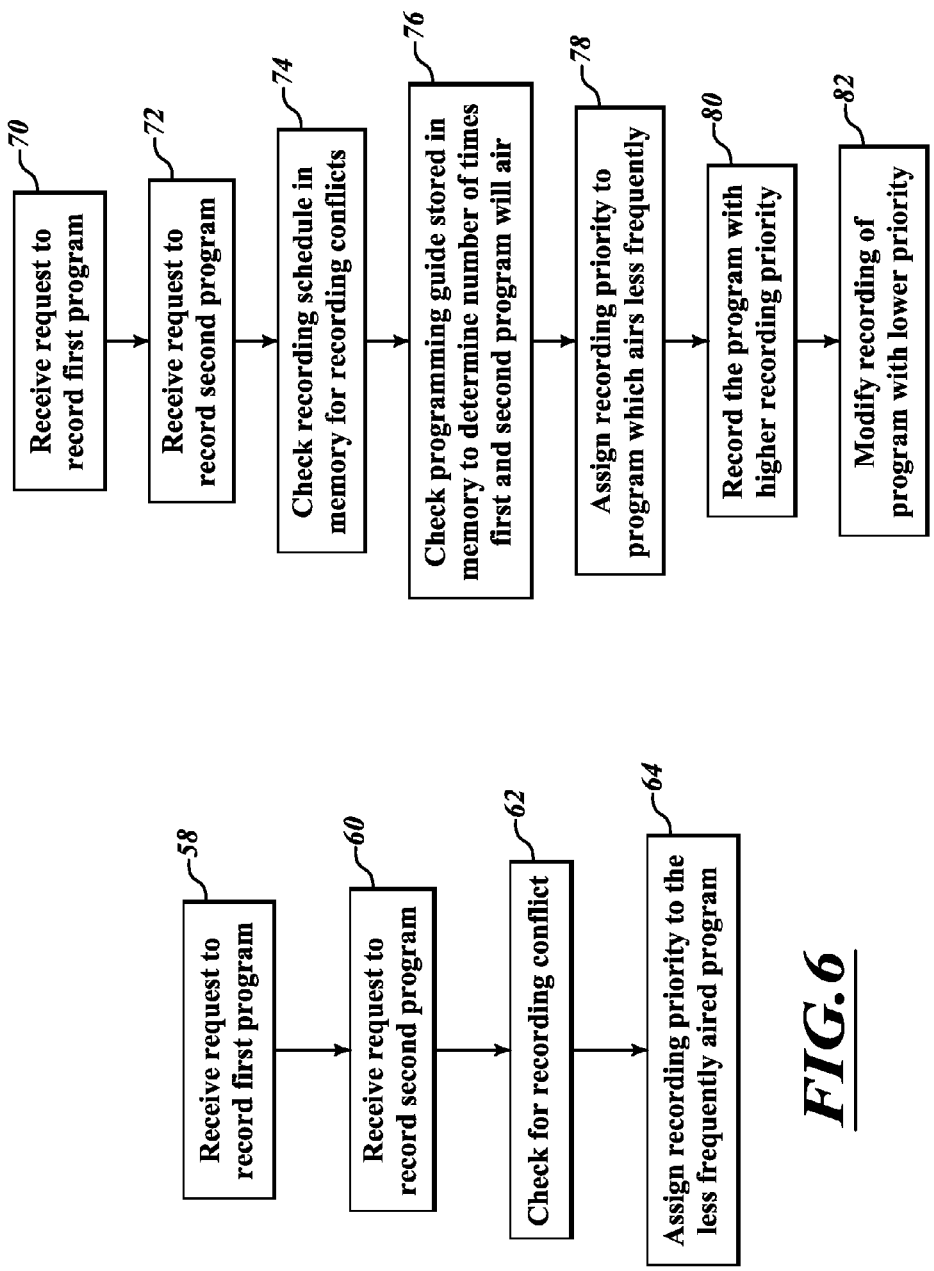

AUTOMATIC PRIORITIZATION OF TIMERS BASED ON FREQUENCY

BACKGROUND

1. Technical Field

The present disclosure relates to the field of television receivers. The present disclosure relates more particularly to the field of recording media programs in a television receiver.

2. Description of the Related Art

Television receivers provide media programs and other media content to a display so that users of the television receiver may view the media programs or other media content. Television receivers typically receive media content from a satellite receiver, a cable television provider, or from an antenna which receives terrestrial broadcasts signals.

Many television receivers download programming guide information which includes information about the media programs each media channel is scheduled to display in a particular time period. In this way the user of the television receiver can view a programming guide and can decide ahead of time what media programs he would like to watch.

Many television receivers also include a digital video recorder (DVR). DVRs are capable of recording media programs received by the television receiver so that they may be viewed by the user at a later selected time. The user will typically access the programming guide using a remote control. While navigating the programming guide, the user can select a media program to be recorded. When the user has selected a media program to be recorded, the television receiver sets a recording timer.

Sometimes two or more media programs selected by the user to be recorded to the DVR will have overlapping timeslots. In this case, one or more programs may not be recorded. This can lead to frustration when the user expects to find a media program recorded to the DVR, but instead finds that the media program was not recorded due to a scheduling conflict with another media program.

BRIEF SUMMARY

One embodiment is a television receiver including a tuner, control circuitry, and a DVR. The control circuitry is configured to automatically resolve recording schedule conflicts between two or more media programs by assigning respective priority levels to the conflicting media programs. The control circuitry is configured to record to the DVR the media program having the highest priority.

In one embodiment, when the control circuitry determines that there is a scheduling conflict between two media programs set to be recorded, the control circuitry will access programming guide data to determine which program is more frequently aired. The control circuitry assigns a higher priority to the program which airs less frequently.

Thus, if there is a scheduling conflict between a media program which airs multiple times per week and a media program which airs only a single time, the media program which airs only a single time will be recorded. The control circuitry can modify the recording schedule of the media program which has the lower priority.

In other embodiments the control circuitry is configured to assign recording priority based on other factors including user preferences, whether or not programs are reruns, whether or not the programs are original airings, and whether or not the programs are live events

BRIEF DESCRIPTION OF THE SEVERAL VIEWS OF THE DRAWINGS

FIG. 1 is an illustration of a residential media entertainment system including a television receiver according to one embodiment.

FIG. 2 is an illustration of a programming guide according to one embodiment.

FIG. 3 is an illustration of a media program recording schedule of the television receiver according to one embodiment.

FIG. 4 is an illustration of a program frequency calendar indicating the times at which two media programs will air according to one embodiment.

FIG. 6 is a flowchart of a method for assigning recording priority to a media program according to one embodiment.

FIG. 7 is a flowchart of a method for assigning recording priority to a media program according to an alternative embodiment.

DETAILED DESCRIPTION

Figure 5:
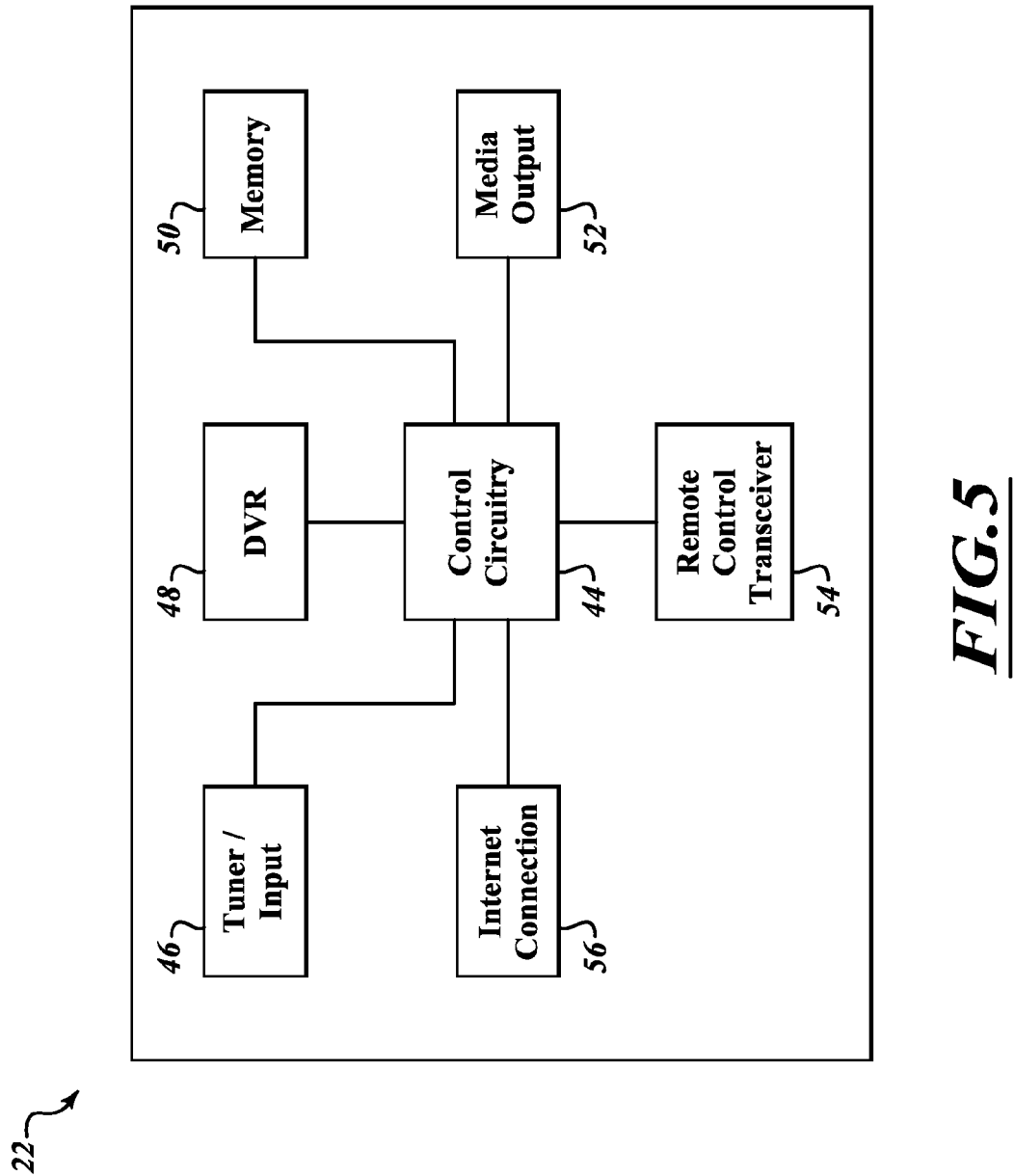
FIG. 5 is a block diagram of a television receiver according to one embodiment.

FIG. 1 illustrates a media entertainment system 20 according to one embodiment. The media entertainment system 20 includes a television receiver 22 coupled to a television 24. The television receiver 22 is coupled to a satellite receiver 26. A media device 28 is also coupled to the television 24. The television receiver 22 is also coupled, by a link 30, to the Internet 32. The television receiver 22 is coupled by the Internet 32 to a remote storage 34.

The satellite receiver 26 receives media content from one or more satellite transponders in orbit above the earth. Each satellite transponder transmits one or more media channels, such as HBO, ESPN, pay-per-view channels, etc. to the satellite receiver 26. The television channels each include a variety of media programs which air at particular times. The one or more satellite transponders also transmit programming guide data to the satellite receiver 26. The programming guide data gives a schedule of the media programs that will air on each media channel for a given time period, such as for a week or month in advance.

The television receiver 22 receives media content from the satellite receiver 26. In particular, the television receiver 22 includes one or more tuners which can tune into a selected media channel received by the satellite receiver 26. The television receiver 22 can display on the television 24 the media content received from the selected media channel.

A user of the television receiver 22 can operate a remote control 35 to cause the television receiver 22 to display the programming guide on the television 24. The user of the television receiver 22 can navigate through the programming guide to determine a media program that the user would like to view. The user can select a media program that the user would like to view. When the user selects a media program that the user would like to view, the television receiver 22 displays the selected a media program on the television 24.

The television receiver 22 also includes a DVR or other memory for recording selected media programs received from the satellite receiver 26. While viewing the programming guide the user may notice a media program which she would like to view, but which she will not be able to view at the scheduled airtime. By using the remote control 35 the user can indicate to the television receiver 22 that the user would like to record the media program to the DVR so that the user may view the media program at a later convenient time. When the user selects a program to be recorded to the DVR, the television receiver 22 sets a recording timer which causes the television receiver 22 to automatically record the selected program at the scheduled time. At a time convenient to the user, the user can operate the remote control 35 to cause the television receiver 22 to display a list of programs that have been recorded to the DVR. The user can select the desired media program from the list of recorded media programs and the television receiver 22 will display the selected media program on the television 24.

As the user selects multiple media programs to be recorded to the DVR, it is possible that two or more of the media programs will have a time conflict in their scheduled air times. When the television receiver 22 determines that there is a time conflict between two media programs which are both scheduled to be recorded, the television receiver 22 follows a particular protocol to automatically assign respective priority levels to the two media programs. The media program that has a higher priority will be recorded at the expense of the media program that has the lower priority if the conflict cannot be resolved.

The television receiver 22 can determine the priority of media programs scheduled to be recorded by accessing programming guide data to look at one or more factors by which priority can be assigned. In one example the television receiver 22 is configured to access the programming guide data to determine the frequency at which the conflicting media programs are scheduled to air, i.e., daily, weekly, monthly, or only a single time. A media program which is scheduled to air more frequently, meaning that the media program airs a relatively high number of times in a given time period, will receive a lower recording priority. This is because episodes of the media program air regularly and therefore the media program can be recorded at another time. A media program which is scheduled to air comparatively less frequently will receive a higher recording priority with respect to the program that is scheduled to air more frequently. This is because it is presumed that the user will not have as many chances to record or view the media program that airs less frequently.

In one embodiment the television receiver 22 accesses the programming guide data and counts a number of times that each conflicting media program will air in a given time, for example in a week, two weeks, or a month. The media program that has the higher number of air times will receive a lower recording priority. The media program that has the lower number of air times will receive a higher recording priority.

The television receiver 22 can also take into account whether the conflicting media programs are airing for the first time or whether they are reruns. For example, in one embodiment the television receiver 22 will assign a higher recording priority to a media program which has a higher number of air times, but whose selected recording time is the original airtime for a particular episode of that media program. Therefore, if the programming guide data indicates that a first media program airs only twice in a two week period, but both air times are reruns, then the first media program may be given a lower priority with respect to a second media program which has four air times but the scheduled recording is an original airing of an episode.

The television receiver 22 can also automatically assign higher priority to live broadcasts such as live sporting events, live awards shows, live musical performances, etc. In one example, if a live sporting event is scheduled to be recorded, it will have a higher priority than a media program which is not broadcast live.

In one embodiment, the user of the television receiver 22 can utilize the remote control to select priority protocols for the television receiver 22. For instance, if the television receiver 22 is configured to assign higher priority to the media program which airs less frequently in all cases, the user can input exceptions to the rules. For example the user can program the television receiver 22 to give higher priority to live sporting events over other programs in all cases, even though the live sporting events may have multiple scheduled reairings. It is possible that the user can select many different rules and configurations by which the television receiver 22 will automatically assign priority. In this way, the user does not have to manually assign priority each time there is a recording conflict. To the contrary, the user can rely on the preprogrammed priority protocol of the television receiver 22, or the user can input new protocol in one or more stages, so that priority assignments can be automatically made by the television receiver 22 without input from the user every time.

Television receiver 22 can include multiple tuners. This allows the television receiver 22 to record two or more programs which air simultaneously. Generally, the television receiver 22 can record one show at a single time for each tuner that the television receiver 22 has. For example, if the television receiver 22 has two tuners then the television receiver 22 can record two media programs simultaneously. Thus if there is a recording conflict between two programs, the television receiver 22 can still record both programs because it has two tuners.

However, even in the circumstance in which the television receiver 22 has multiple tuners, it is still possible that there will be a time conflict between a larger number of media programs than the number of tuners included in the television receiver 22. Also, even if there are two tuners, in some cases it might only be possible for one tuner to access the DVR hard drive at a time. In this case the television receiver 22 can assign recording priority levels to each of the conflicting media programs. The media program or programs having the lowest recording priority levels will have their scheduled recordings modified in favor of those media programs that have the higher priority levels.

The television receiver 22 can assign a different priority level to many different media programs. For example, if the television receiver 22 has three tuners, but there is a conflict between seven scheduled media programs, then the television receiver 22 can assign priority levels 1-7 to each of the conflicting media programs. The three media programs having the lowest recording priorities will have the recording schedules modified.

In one embodiment the television receiver 22 is configured to modify the recording schedule of the lower priority media program by recording the parts of the lower priority media program, if any, that do not overlap with the schedule recording time of the higher priority media program. Alternatively, the television receiver 22 can delete the scheduled recording timer of the low priority media program. In this case the television receiver 22 can instead schedule a recording of the next available airtime of the low priority media program.

While the television receiver 22 has been described as being connected to a satellite receiver 26, in other embodiments the television receiver 22 can receive media content from a cable television provider, from an antenna which receives terrestrial broadcast signals, or in any other suitable way.

Likewise, while the automatic assignment of recording priorities has been described as being implemented with respect to a television receiver 22 having a DVR or other memory coupled thereto, principles of the present disclosure can be utilized in many other kinds of systems. For example, in one embodiment the television receiver 22 receives media content via the Internet 32. The user of the television receiver 22 can schedule media program recordings by accessing the Internet 32 through a smart phone, a PC, a tablet, a laptop, or other suitable means for accessing the Internet. The user can log into an account associated with the television receiver 22 and can schedule recordings via the Internet 32. In this case the television receiver 22 may include a DVR or other memory which stores the recorded programs, or the television receiver 22 may access, via the Internet 32, the recorded programs stored in a remote storage 34.

For example, when the user of the television receiver 22 selects a media program to be recorded, the media program is recorded to remote storage 34 as opposed to a DVR physically coupled to the television receiver 22. The media programs can be viewed by connecting the television receiver 22 to the Internet 32 to access the remote storage 34. The remote storage 34 is, for example, a hard drive stored in a bank of hard drives or another kind of memory located in location remote from the television receiver 22. The television receiver 22 can be a set-top box coupled to the television 24, television receiver hardware built into the television 24, a gaming console, a smart phone, a tablet, a laptop, a desktop computer, or other type of device which can receive media content by accessing the Internet 32. In these cases, the automatic assignment of recording priority can be done by control circuitry associated with the television receiver 22, or control circuitry accessible via the Internet 32.

FIG. 2 illustrates a programming guide 36 according to one embodiment. The programming guide illustrated in FIG. 2 is an example of how a programming guide may appear when displayed by the television receiver 22 on the television 24. The programming guide 36 includes the media programs which will air on a plurality of media channels between 6:00 and 8:30 PM on a particular night.

Channels appearing on the programming guide 36 of FIG. 2 include CBS, ABC, NBC, ESPN, ESPN2, TBS, and CNN. In practice, the programming guide 36 can include more or fewer channels as well as different channels than are shown in relation to FIG. 2.

A user of the television receiver 22 can the scroll through the programming guide 36 and can select different channel lineups to be viewed as well as different time periods in the future. The programming guide 36 can also be displayed with respect to a particular theme such as children's channels, sports channels, pay-per-view channels, news channels, etc.

While navigating through the programming guide 36, the user may select a program which she wishes to record. In the case of FIG. 2, the user has selected to record the NBA basketball game on ESPN airing between 6:00 and 8:30 PM. The user has also selected to record Seinfeld on TBS at 6:00 PM.

As described previously, the television receiver 22 determines that there is a scheduling conflict between the two scheduled recorded programs. Rather than alerting the user that there is a scheduling conflict and asking the user to select which program to assign higher priority to, the television receiver 22 will assign respective priorities to the two conflicting programs based on a priority protocol stored in a memory of the television receiver 22. In one example the priority protocol includes determining which program airs more frequently and assigning a lower priority to that program. In one example the priority protocol includes giving priority to live events such as the NBA basketball game shown in the programming guide 36.

The television receiver 22 assigns respective priorities to the conflicting media programs and then modifies the recording schedule of the media program having lower priority. The media program having higher priority is recorded as scheduled. The media program with the lower priority is recorded at a later time when it is broadcast again, without the need for the user to set the timer again or input another programming request.

FIG. 3 illustrates a recording schedule 38 listing all of the scheduled recordings for the near future. In the exemplary recording schedule 38 of FIG. 3, the scheduled recordings of Seinfeld, NBA basketball, and 60 minutes are listed, among others.

In one embodiment, whenever the user selects a media program to be recorded, the television receiver 22 checks the recording schedule 38 stored in a memory of the television receiver 22. The television receiver 22 checks the recording schedule 38 stored in the memory of the television receiver 22 in order to determine if there are any scheduling conflicts with the newly selected media program to be recorded. If there is a conflict between the scheduled recordings, then the television receiver 22 can automatically assign recording priorities to the conflicting media programs as described previously.

While the recording schedule 38 of FIG. 3 is depicted as it might appear on the television 24 when accessed by the user, in most embodiments, when the television receiver 22 checks recording schedule 38 for recording conflicts, the television 24 does not display the recording schedule 38.

In one embodiment, when the user accesses the recording schedule 38, the recording schedule 38 gives an indication that there is a recording conflict. The recording schedule 38 also indicates what priority level the television receiver 22 has assigned to each of the conflicting programs. In this case, the user can override the priorities automatically assigned by the television receiver 22. If the user overrides the automatically assigned priorities, then the television receiver 22 can prompt the user to update the priority protocol stored in the memory of the television receiver 22. The user then has the option to adjust the priority protocol stored in the memory of the television receiver 22 if she desires.

In one embodiment the television receiver 22 automatically updates the priority protocol when the user manually overrides assigned priorities. The television receiver 22 can update general rules of the priority protocol or the television receiver 22 can implement a single exception to the priority protocol based on the particular programs whose priorities the user has overridden. In this way, the television receiver 22 can continually learn and update the priority protocol based on the actions or preferences of the user.

FIG. 4 illustrates a programming frequency calendar 39 generated by the television receiver 22 upon detecting a conflict between scheduled recordings of media programs. In this case, as shown in FIG. 2, the user has selected to record Seinfeld and a particular NBA basketball game during overlapping timeslots.

Accordingly, the television receiver 22 has undertaken to determine the frequency of airings of each of the conflicting programs. The television receiver 22 does this by generating a programming frequency calendar 39 in which the days of the calendar are marked to indicate whether one of the conflicting programs will air on that particular day. In the case of the programming frequency calendar 39 of FIG. 4, it is indicated that Seinfeld will air twice on each weekday in the month of March, 2013. It is also indicated that the Heat versus Bulls NBA basketball game will air only a single time, on March 13.

Based on this, the television receiver 22 can assign respective priorities to the scheduled recordings of Seinfeld and the NBA basketball game. In one embodiment, because Seinfeld is scheduled to air a greater number of times than the Heat vs. Bulls NBA basketball game, Seinfeld is given a lower recording priority while the NBA basketball game is given a higher recording priority.

Of course, the assigned priorities can be based on more factors than just the number of times that each program will air. As described previously, the priority protocol can take into account whether the media program is a live event, whether it is a first-time airing, whether it is a rerun, whether the user has selected to record every airing of the media program, etc.

FIG. 5 is a block diagram of a television receiver 22 according to one embodiment. The television receiver 22 includes control circuitry 44. The control circuitry 44 controls the function of the television receiver 22 and the various components of the television receiver 22. The television receiver 22 further includes a tuner 46 coupled to the control circuitry 44, a DVR 48 coupled to the control circuitry 44, a memory 50 coupled to the control circuitry 44, a media output 52 coupled to the control circuitry 44, a remote control transceiver 54 coupled to the control circuitry 44, and an Internet connection 56 coupled to the control circuitry 44.

The tuner 46 is configured to be coupled to the satellite receiver 26 described previously with respect to FIG. 1. The tuner 46 controls which media channel is received by the television receiver 22. The control circuitry 44 controls the tuner 46 and causes the tuner 46 to select a particular media channel.

The control circuitry 44 records selected media programs to the DVR 48 as described previously. In particular, when the user selects a media program to be recorded, the control circuitry records the media program to the DVR 48 at the scheduled recording time.

The memory 50 stores software data associated with the television receiver 22. For example, the priority protocol, the programming guide data, the recording schedule data, executable software programs, and many other kinds of data related to the operation of the television receiver 22 can be stored in the memory 50. Control circuitry 44 can access these data and software instructions to perform the operations of the television receiver 22.

The media output 52 is configured to be coupled to the television 24 or to other media devices. In one embodiment the media output 52 outputs media programs to the television 24 to be displayed on the television 24. The media output 52 can include media output ports such as coaxial cable ports, Ethernet ports, HDMI ports or other suitable output ports for outputting media or data to an electronic device. The media output 52 can further include audio and video processing circuitry to process media programs before they are output to the television 24 or other electronic device.

The remote control transceiver 54 includes receiver and transmitter circuitry to communicate with a remote control 35. The remote control transceiver 54 receives remote control signals from the remote control 35 and passes them to the control circuitry 44. The control circuitry 44 then executes the commands received from the remote control the other remote control 35. Likewise the remote control transceiver 54 can include circuitry for outputting signals to the remote control 35 or to other electronic devices. The remote control transceiver 54 can include IR and RF receivers and transmitters or any other suitable wireless transmitters and receivers.

When a user of the television receiver 22 selects a media program to be recorded, the control circuitry 44 of the television receiver 22 checks the recording schedule data stored in the memory 50 to determine if there is a recording conflict. If there is a recording conflict, then the control circuitry 44 automatically assigns recording priorities to the conflicting media programs.

The control circuitry 44 executes software instructions stored in the memory 50 related to the priority protocol for assigning recording priorities to conflicting media programs. In one embodiment, the control circuitry 44 checks the programming guide data to create a programming frequency calendar 39 as described previously in relation to FIG. 4. The control circuitry 44 counts number of times that the conflicting media programs will each air any given time period and assigns recording priorities to the conflicting media programs based in part on the number of air times of each program.

The control circuitry 44 can also write new priority protocol data to the memory 50. The new priority protocol data can be written based on priority instructions given by the user, or based on the preferences of the user as determined by the control circuitry 44.

The control circuitry 44 can also access the Internet 32 through the Internet connection 56. The Internet connection 56 can include Ethernet ports, coaxial cable ports, phone line ports, wireless Internet antennas, or any other suitable hardware and software for accessing the Internet 32.

In one embodiment the television receiver 22 receives media content through the Internet connection 56. The media content can include media content which is currently airing on a media channel, or a recorded media program which has been recorded in a remote storage 34 as described previously.

The television receiver 22 can have more or fewer components than are shown in FIG. 5 depending on the particular type of television receiver 22. For example, the television receiver 22 can be a set-top box, television receiver hardware integrated in a television 24, a gaming console, a smart phone, a laptop, a tablet, a desktop computer, or other suitable devices for receiving media content. Accordingly particular components of the television receiver 22 will vary according to the particular type of television receiver 22.

FIG. 6 is a flowchart for a process for assigning recording priorities to conflicting media programs scheduled to be recorded. At 58, the television receiver 22 receives the request to record a first media program. At 60, the television receiver 22 receives the request to record a second media program. The television receiver 22 can receive the request to record the first and second media programs via a remote control, via the Internet 32, or in any other suitable manner.

At 62, the television receiver 22 checks to see if there is a recording conflict between the first and second media programs. If there is a recording conflict between the first and second media programs, then at 64 the television receiver 22 automatically assigns recording priorities to the less frequently aired program. Alternatively, the television receiver 22 can automatically assigned recording priorities based on the other factors in addition to or aside from the frequency with which the programs are aired.

FIG. 7 is a flowchart for a process for assigning recording priorities to schedule media programs according to an alternative embodiment. At 70 the television receiver 22 receives the request from the user to record a first media program. At 72 the television receiver receives a request to record a second media program. The television receiver 22 can receive the request to record the first and second media programs via a remote control, via the Internet 32, or in any other suitable manner.

A 74 the control circuitry 44 of the television receiver 22 checks the recording schedule data in the memory 50 of the television receiver 22 to determine if there is a recording conflict. If there is a recording conflict, then at 76 the control circuitry 44 of the television receiver 22 checks the programming guide data stored in the memory 50 of the television receiver 22 to determine a number of times that the first and the second media programs will air in a given time period.

At 78 the control circuitry 44 assigns a higher recording priority to the program which airs less frequently. Alternatively, as described previously, the recording priority can be based on other factors in addition to or aside from the frequency with which the media programs are aired.

At 80 the control circuitry 44 of the television receiver 22 records the program with higher recording priority to the DVR 48. At 82 the control circuitry 44 of the television receiver 22 modifies the recording schedule of the program with lower recording priority. In one embodiment, the control circuitry 44 records the parts, if any, of the lower priority program that do not conflict with the higher priority program. Alternatively, the control circuitry 44 can cancel the scheduled recording of the lower priority program. The control circuitry 44 can then schedule a recording of a later airing of the canceled media program. The control circuitry 44 can modify the scheduled recording of the lower priority program in many other suitable ways as will be apparent to those of skill in the art in light of the present disclosure.

While particular devices and methods for automatically assigning priorities to conflicting media programs have been described with respect to FIGS. 1-7, many other devices and methods for automatically assigning recording priorities can be implemented utilizing principles of the present disclosure as will be apparent to those of skill in the art in light of the present disclosure. All such other devices and methods fall within the scope of the present disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    receiving, in a television receiver, a request to set a first recording timer to record a first media program;
    receiving, in the television receiver, a request to set a second recording timer to record a second media program;
    checking a recording schedule stored in a memory of the television receiver to determine whether there is a conflict between the first and the second recording timers; and
    if there is a conflict between the first and second recording timers, then determining, in a control circuit of the television receiver, a number of times that the first media program is scheduled to be broadcast by reviewing programming guide data stored in the memory; and
    assigning, in the control circuit, respective recording priorities to the first and second recording timers based on the number of times that the first program will be broadcast.

2. The method of claim 1 comprising recording the first media program instead of the second media program during a conflicting time period with the second media program if the first media program has a higher priority than the second media program.

3. The method of claim 2 comprising determining, in the control circuit, a number of times that the second media program will be broadcast by reviewing the programming guide data stored in the memory.

4. The method of claim 3 wherein a higher priority is assigned to the first media program if the number of times that the first media program will be broadcast is less than the number of times that the second media program will be broadcast.

5. The method of claim 1 wherein assigning the respective priorities is based, at least in part, on whether the first media program is a rerun.

6. The method of claim 1 wherein assigning the respective priorities is based, at least in part, on if the first media program is a live event.

7. The method of claim 1 wherein assigning the respective priorities is based, at least in part, on if the first media program is a sporting event.

8. A method comprising:
    receiving, in a television receiver, a request to record a first media program;
    receiving, in the television receiver, a request to record a second media program;
    determining, in a control circuitry of the television receiver, if there is a scheduling conflict between the first and the second media programs;
    executing a recording priority protocol stored in a memory of the television receiver, the recording priority protocol including;
        counting a number of air times of the first media program; and
        counting a number of air times of the second media program;
    assigning respective recording priorities to the first and second media programs based on the recording priority protocol and without receiving user priority input.

9. The method of claim 8 wherein executing the recording priority protocol includes assigning a higher recording priority to the first media program if the number of air times of the first media program is lower than the number of air times of the second media program.

10. The method of claim 8 comprising altering the recording priority protocol based on user input.

11. The method of claim 8 wherein executing the recording priority protocol includes determining if the first and second media programs are live events.

12. The method of claim 8 wherein executing the recording priority protocol includes determining if the first and second media programs are first time airings.

13. A television receiver comprising:
    a media input configured to receive media content;
    a DVR configured to record selected media content;
    a memory configured to store programming data and software instructions for operating the television receiver;
    a media output configured to output media content to a display; and
    control circuitry configured to receive a request to record first and second media programs, to check the memory to determine if there is a scheduling conflict between the first and the second media programs, to determine respective numbers of times that the first and second media programs will air in a selected time period, and to assign respective recording priorities to the first and the second media programs based on the respective numbers of times that the first and the second media programs will air.

14. The television receiver of claim 13 wherein the media input receives media content via the Internet.

15. The television receiver of claim 13 wherein the media input receives media content via a satellite receiver or a cable television provider.

16. The television receiver of claim 13 wherein the control circuitry is configured to assign the respective priorities based, at least in part, on whether the first media program is a rerun.

17. The television receiver of claim 13 wherein the control circuitry is configured to assign the respective priorities based, at least in part, on whether the first media program is a live event.

\* \* \* \* \*